United States Patent
Bhowal et al.

(10) Patent No.: US 10,997,373 B2
(45) Date of Patent: May 4, 2021

(54) DOCUMENT-BASED RESPONSE GENERATION SYSTEM

(71) Applicant: Walmart Apollo, LLC, Bentonville, AR (US)

(72) Inventors: Riyanka Bhowal, West Bengal (IN); Mainak Mitra, West Bengal (IN); Ritish Menon, Haryana (IN); Omker Mahalanobish, Kolkata (IN)

(73) Assignee: Walmart Apollo, LLC, Bentonville, AR (US)

(*) Notice: Subject to any disclaimer, the term of this patent is extended or adjusted under 35 U.S.C. 154(b) by 184 days.

(21) Appl. No.: 16/423,002

(22) Filed: May 25, 2019

(65) Prior Publication Data

US 2020/0327197 A1 Oct. 15, 2020

(30) Foreign Application Priority Data

Apr. 9, 2019 (IN) .............................. 201941014265

(51) Int. Cl.
| | | |
|---|---|---|
| *G06F 40/30* | (2020.01) | |
| *G06N 20/00* | (2019.01) | |
| *G06F 40/279* | (2020.01) | |
| *G10L 15/22* | (2006.01) | |

(52) U.S. Cl.
CPC ............ *G06F 40/30* (2020.01); *G06F 40/279* (2020.01); *G06N 20/00* (2019.01); *G10L 15/22* (2013.01)

(58) Field of Classification Search
CPC ....................................................... G10L 15/22
See application file for complete search history.

(56) References Cited

U.S. PATENT DOCUMENTS

| | | | |
|---|---|---|---|
| 7,783,486 B2 | 8/2010 | Rosser et al. | |
| 8,015,006 B2 | 9/2011 | Kennewick et al. | |
| 9,135,237 B2 | 9/2015 | Deshmukh et al. | |
| 9,196,245 B2 | 11/2015 | Larcheveque et al. | |
| 9,275,641 B1 | 3/2016 | Gelfenbeyn et al. | |
| 9,369,410 B2 | 6/2016 | Capper et al. | |
| 10,586,532 B1* | 3/2020 | Cavallo | G10L 15/1815 |
| 2014/0059033 A1* | 2/2014 | Shaw | G06F 40/45 |
| | | | 707/708 |

(Continued)

OTHER PUBLICATIONS

Nishio, Yusuke, "Automatic Utterance Generation in Consideration of Nominatives and Emoticon Annotation", PACLIC-27, 2013, pp. 66-74.

(Continued)

*Primary Examiner* — Douglas Godbold

(57) ABSTRACT

Examples provide a system for generating document-based responses to user provided queries. The response generation component creates a set of generated utterances based on text associated with a set of sentences in at least one document. Each utterance in the set of generated utterances is assigned an intent. A filter component identifies at least one utterance from the set of generated utterances having a same intent as a user-provided utterance to form a set of filtered utterances. A selection component identifies one or more utterance(s) from the set of filtered utterances having a shortest distance from the user-provided utterance. If more than one utterance is identified, a weighted summarization response is output to the user based on a predefined answer to each utterance in the selected set of utterances.

20 Claims, 11 Drawing Sheets

(56) References Cited

U.S. PATENT DOCUMENTS

| | | | | |
|---|---|---|---|---|
| 2018/0060307 A1* | 3/2018 | Misra | .................... | G06N 20/00 |
| 2020/0042597 A1* | 2/2020 | Wu | ....................... | G06F 40/58 |
| 2020/0097544 A1* | 3/2020 | Alexander | ........... | G06N 3/0454 |
| 2020/0097563 A1* | 3/2020 | Alexander | ............. | G06Q 30/01 |
| 2020/0168210 A1* | 5/2020 | Seo | ........................ | G10L 15/22 |
| 2020/0184959 A1* | 6/2020 | Yasa | ..................... | G06F 16/334 |
| 2020/0210758 A1* | 7/2020 | Upadhyay | ............ | G06K 9/6215 |

OTHER PUBLICATIONS

Risueno, Tita, "Fully automated training for conversational bots", bitext, Sep. 8, 2017, https://blog.bitext.com/fully-automated-training-for-conversational-bots, pp. 1-6.

* cited by examiner

DOCUMENT-BASED RESPONSE GENERATION SYSTEM

BACKGROUND

A chatbot is a software component designed to respond to user input to simulate conversations and/or provide information to users. Current chatbots require a programmer to manually enter all possible questions or utterances that other users of the chatbot might input into the chatbot. The programmer also manually provides all the various responses to the utterances for the chatbot to output/return to the user in response. Chatbots typically are trained using a substantial volume of manually created data (utterances) to enable the system to response to user questions. If the chatbot is not provided with a sufficient number of possible utterances and answers/responses to the utterances, the chatbot may be unable to provide a meaningful response to all user queries. Moreover, manually creating training data frequently requires review of large quantities of policy documents and other domain-specific information. This can be a labor-intensive, time consuming and tedious process for human users.

SUMMARY

Some examples provide a system for customized document-based response generation to a user query. The system includes at least one processor communicatively coupled to a memory. A filter component identifies a set of filtered utterances from a set of generated utterances having a same intent as an identified intent associated with a user-provided utterance. A calculation component computes a distance between the user-provided utterance and each utterance in the set of filtered utterances. A scoring component generates a similarity score for each utterance in the set of filtered utterances based on the computed distance for each utterance. A selection component selects a set of utterances from the set of filtered utterances having a similarity score exceeding a threshold value. A response generation component generates a weighted summarization response based on a predefined answer to each utterance in the selected set of utterances. A user interface device outputs the weighted summarization response to a user associated with the user-provided utterance.

Other examples provide a computer-implemented method for generating responses to user provided queries. An utterance generator creates a set of generated utterances based on text associated with a set of sentences in at least one document, each utterance in the set of generated utterances assigned an intent. A filter component filters at least one utterance from the set of generated utterances having a same intent as a user-provided utterance to form a set of filtered utterances. The user-provided utterance is received from a user device associated with the user via a network. A selection component selects a set of utterances from the set of filtered utterances having a similarity score exceeding a threshold value. The similarity score indicates a degree of similarity between the generated utterance and the user-provided utterance. A response generation component generate a weighted summarization response based on a predefined answer to each utterance in the selected set of utterances. The user interface device outputs the weighted summarization response to the user associated with the user-provided utterance.

Still other examples provide a computer storage media having computer-executable instructions for generating customized responses to user queries. The computer-executable instructions are executed by a computer to cause the computer to filter an utterance from the set of generated utterances having a same intent as a user-provided utterance to form a set of filtered utterances. The user-provided utterance is received from a user device associated with the user via a network. A selection component selects a set of utterances from the set of filtered utterances having a similarity score exceeding a threshold value. The similarity score indicates a degree of similarity between the generated utterance and the user-provided utterance. A response generation component generates a weighted summarization response based on a predefined answer to each utterance in the selected set of utterances and a set of weights. The user interface device outputs the weighted summarization response to the user associated with the user-provided utterance. The set of weights is updated based on feedback received from at least one user rating the weighted summarization response relative to the user-provided utterance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

Referring to the figures, examples of the disclosure enable a dynamic response generation system which autonomously creates self-generated utterances and answers corresponding to those utterances based on analysis of a policy document with minimal or no user intervention. The system further provides automated responses to user-specific questions based on a policy document.

In some examples, the response generation component includes machine learning for providing document-based responses to user utterances without user-generated utterances and answers. In other words, the system analyzes a document, creates utterances, answers to those utterances and dynamically outputs answers to user queries based on the utterances and answers created autonomously by the system. This reduces developer interference with the system and improves developer efficiency by eliminating the tedious and cumbersome process of manually generating the utterances and answers by the developers.

Figure 1:
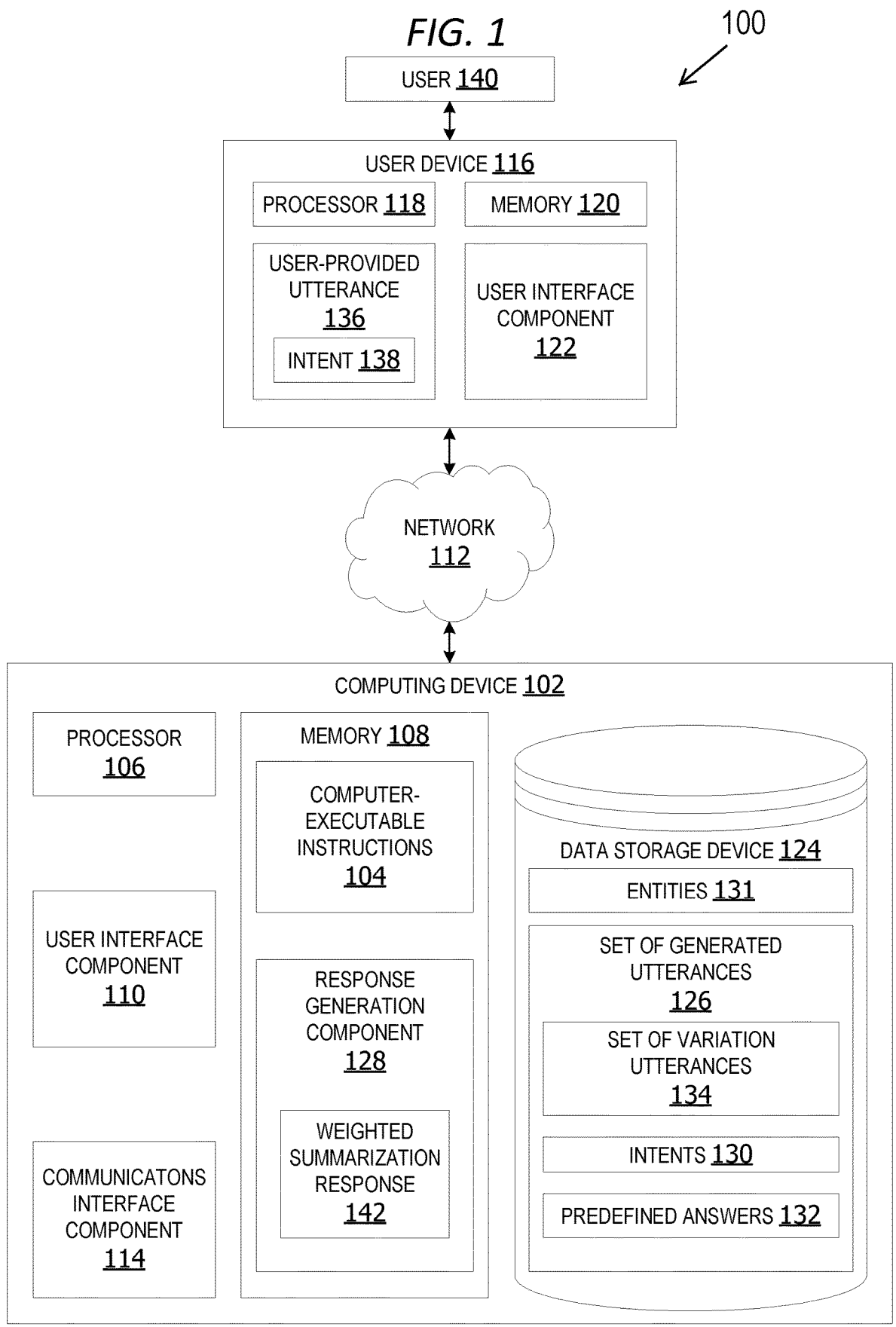
FIG. 1 is an exemplary block diagram illustrating a system for document-based response generation.

Referring again to FIG. 1, an exemplary block diagram illustrates a system 100 for document-based response generation. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface component 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 9 and FIG. 10).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. The term "BLUETOOTH®" as used herein refers, in some examples, to a wireless technology standard for exchanging data over short distances using short wavelength radio transmission. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to the user device 116, can occur using any protocol or mechanism over any wired or wireless connection. In some examples, the communications interface component 114 is operable with short range communication technologies such as by using near-field communication (NFC) tags.

The user device 116 represent any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor 118 and a memory 120. The user device 116 can also include a user interface component 122.

The system 100 can optionally include a data storage device 124 for storing data, such as, but not limited to a set of generated utterances 126. The set of generated utterances 126 includes one or more utterances created by a response generation component 128 based on a document.

The set of generated utterances 126 includes predefined answers 132 corresponding with the set of generated utterances. Each utterance in the set of generated utterances is mapped to at least one corresponding answer/response in the predefined answers 132. An answer includes the information requested in an utterance. In the example above, the answer to an utterance associated with requesting vacation time can include a form number associated with a vacation request form, information regarding where to send the form, and/or the number of days in advance a vacation request form should be submitted by an employee prior to the requested vacation day.

The set of generated utterances can also include one or more entities 131 in some non-limiting examples. An entity in the entities 131 refers to a source of the laws/rules/policies or applicable information associated with the subject, topic, classification or category of the user-provided utterance. Each utterance in the set of generated utterances 126 is associated with an entity in some examples.

The set of generated utterances 126 includes a set of known or predetermined intents 130. An intent in the predetermined intents 130 is an intent assigned to each utterance in the set of generated utterances. The intent identifies the purpose of the query or type of information desired by the user. In other words, the intent identifies the type of information the utterance is intended to obtain from the system. For example, an utterance in the set of generated utterance asking "how to request vacation time" has an entity associated with leave or work absences and an intent associated with obtaining information regarding the appropriate forms or procedures for an employee to request vacation time or how to use vacation days.

The set of generated utterances 126 in some examples includes a set of variation utterances 134. The set of variation utterances 134 includes one or more variations to an utterance in the set of generated utterances created by the response generation component 128. A variation to an utterance is mapped to the same answer as the corresponding utterance.

In a non-limiting example, if an utterance "number of sick days" is mapped to an answer "six days", a variation utterance "how many days for illness" is mapped to the same answer. Another variation utterance "how much sick leave" can also be included in the set of variation utterances and mapped to the same answer "six days," as well.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database, such as, but not limited to, the database 312 shown in FIG. 3 below.

The data storage device 124 in this example is included within the computing device 102 or associated with the computing device 102. In other examples, the data storage device 124 includes a remote data storage accessed by the computing device via the network 112, such as a remote data storage device, a data storage in a remote data center, or a cloud storage.

The memory 108 in some examples stores one or more computer-executable components, such as, but not limited to, the response generation component 128. The response generation component 128 creates the set of generated utterances based on text associated with a set of sentences in at least one document. Each utterance in the set of generated utterances assigned an intent.

The response generation component autonomously generates the set of generated utterances. A human user is not required to manually generate utterances and responses for the chatbot. Instead, the user simply inputs a policy document containing the relevant information into the system 100 and the response generation component automatically analyzes the document for facts associated with various intents and entities. The response generation component applies machine learning (pattern recognition) to anticipate what questions may be asked by users based on information/facts in the policy document. The response generation component generates all possible questions (utterances) which may be asked by users and maps those questions to answers extracted from the document. The system converts this information into the set of generated utterances and answers for use by the chatbot system 100.

When the response generation component 128 receives a user-provided utterance 136 from a user 140 associated with the user device 116, the response generation component 128 analyzes the user-provided utterance to identify the intent 138 of the utterance. The user-provided utterance can be referred to as a query, a user-provided query, a user input utterance, a user question or any other term to refer to a query or question provided by the user to the response generation system.

The user-provided utterance 136 is received by the user device via the user interface component 122 and transmitted to the computing device 102 via the network in this example. In other examples, the user-provided utterance 136 can be entered/provided directly to the computing device 102 via the user interface component 110. The user-provided utterance 136 can be entered as a text query or a natural speech query detected via a microphone associated with the user interface component 122 on the user device 116 or the user interface component 110 on the computing device 102.

The response generation component 128 filters one or more utterances having the same intent as a user-provided utterance to form a set of filtered utterances, the user-provided utterance received from a user device associated with the user via a network 112. The response generation component 128 calculates a distance between the user-provided utterance 136 and each utterance filtered from the set of generated utterances 126. The response generation component 128 assigns a similarity score to each filtered utterance from the set of generated utterances 126 based on the computed distance for each utterance.

In other words, weighting of responses in some examples is performed based on distance calculated and/or the score assigned to each utterance. If it is closer to the question asked, it is closer to the user's query and has a smaller distance value.

The response generation component 128 selects the one or more best filtered utterances based on the similarity scores. In some examples, the response generation component 128 selects utterances having a similarity score exceeding a threshold value. The similarity score indicates a degree of similarity between the generated utterance and the user-provided utterance.

The response generation component 128 generates a weighted summarization response 142 responsive to the user-provided utterance based on the predefined answers 132 to each selected utterance from the set of generated utterances 126. The weighted summarization response 142 is a customized response including one or more predefined answers to one or more of the selected utterances. The weighted summarization response 142 is output to the user 140. In some examples, the weighted summarization response 142 is sent to the user device 116 for display or presentation to the user 140 via the communications interface component 114.

Figure 2:
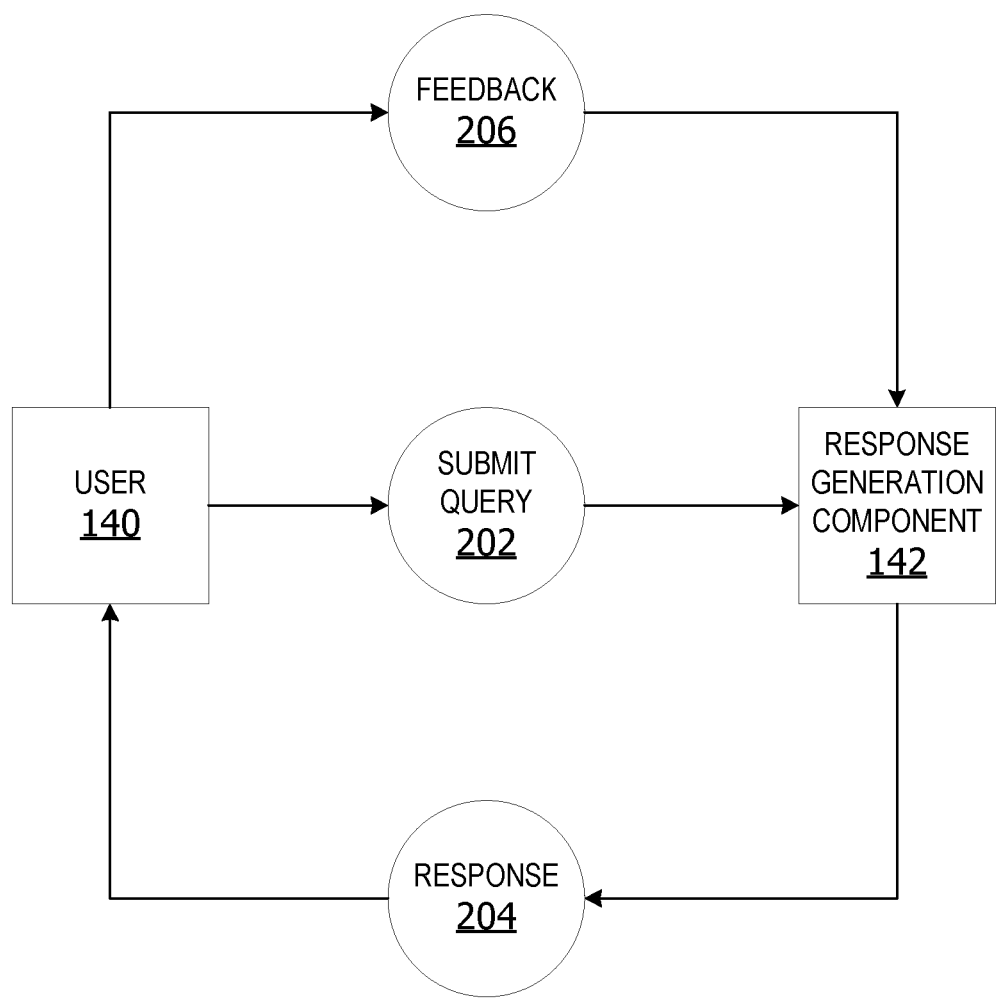
FIG. 2 is an exemplary block diagram illustrating a system for generating responses to user-generated queries.

FIG. 2 is an exemplary block diagram illustrating a system for generating responses to user-generated queries. In this non-limiting example, the user 140 submits a query 202 to the response generation component 128. The query can be submitted via a network or provided via a user interface component associated with the response generation component 128. The response generation component 128 generates a customized response 204 dynamically based on contents of a policy document or other text-based document. The user 140 provides feedback 206 to the response generation component 128 indicating whether the response 204 was satisfactory/accurate.

In this non-limiting example, the system retrains itself via artificial intelligence (AI) and machine learning based on the feedback 206 received from one or more users associated with one or more responses generated by the system. If the response 204 was unsatisfactory or failed to answer the user's query, the user feedback 206 can include a user-provided intent. The user-provided intent is feedback indicating the actual intent/purpose of the query (indicate desired type of information) if the response fails to provide desired information. In this manner, the system is able to adjust and refine responses for improved accuracy and relevancy of answers provided to users with minimal user interface/input to the system.

In this manner, the response generation component includes a framework and a machine learning model which automatically generates grammatically correct utterances likely to be asked by users based on analysis of sentences/paragraphs of one or more policy documents. The generated utterances can be targeted towards same context related to the sentence/paragraphs of the policy document(s). The system identifies the intent & entity of each utterance in the generated utterances as well as the intent and entity of a user-provided utterance (query). The system dynamically generates a customized weighted summarized response to the user's utterance (query) in real-time. The system further incorporates feedback from the user to retrain itself automatically for improved relevancy of generated responses.

Figure 3:
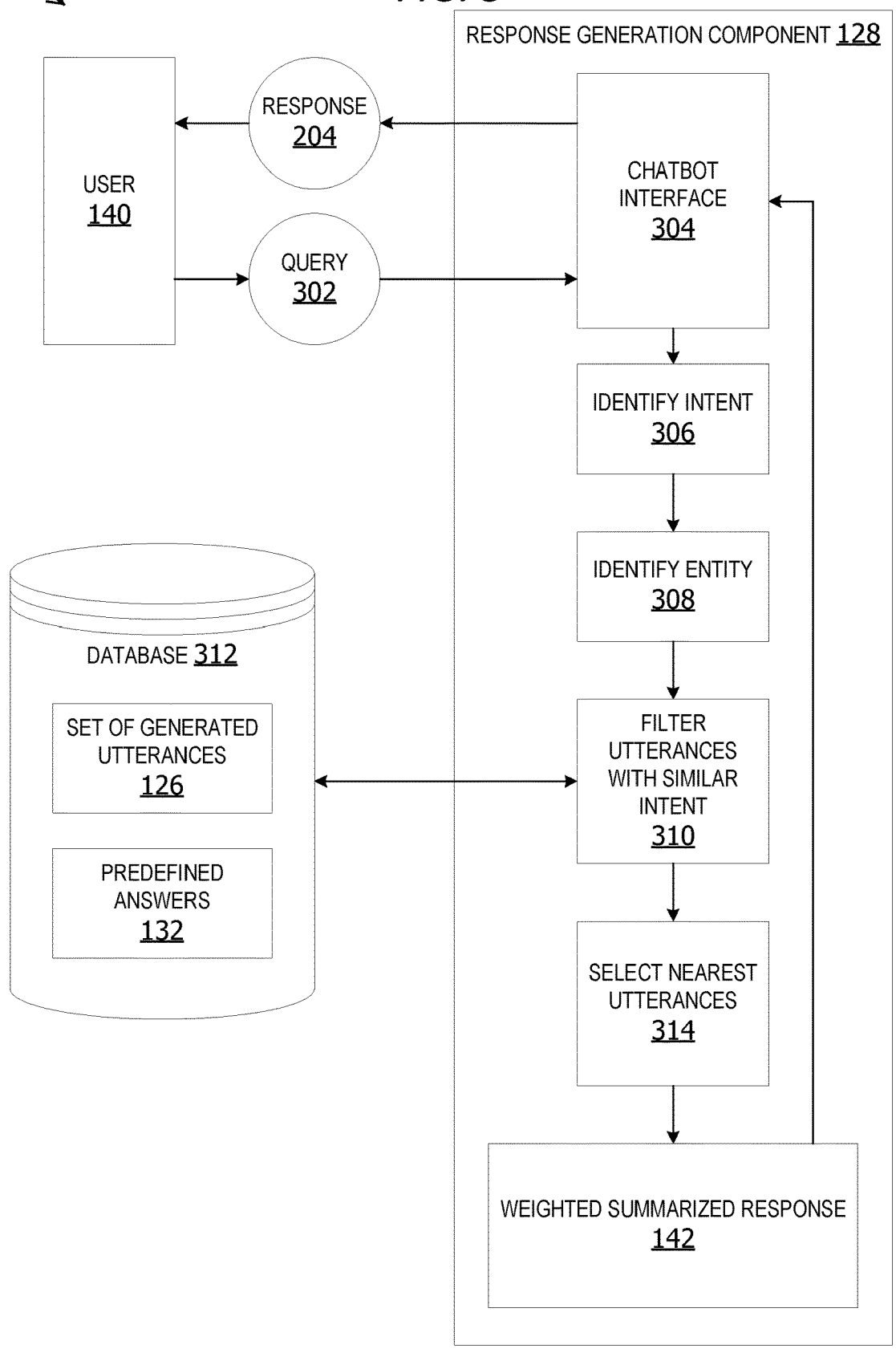
FIG. 3 is an exemplary block diagram illustrating a system for dynamic response generation based on user-generated queries.

FIG. 3 is an exemplary block diagram illustrating a system 300 for dynamic response generation based on user-generated queries. In this non-limiting example, the user 140 submits a query 302 to the response generation component 128. The query 302 is a question submitted to the system 300, such as, but not limited to, the user-provided utterance 136. A chatbot interface 304 receives the query 302 and identifies the intent 306 and identifies the entity 308 associated with the query 302 from an exhaustive list of intents and entities. The exhaustive list of intents is a list of one or more predefined intents associated with one or more generated utterances, such as, but not limited to, the intents 130 and entities 131 in FIG. 1.

The response generation component 128 filters out one or more utterances from the set of generated utterances 126 that has the same or similar intent 310 as the query 302. The response generation component 128 selects the nearest utterances 314. The nearest utterances can be selected based on keywords among utterances and queries.

The set of generated utterances 126 in this example are stored on a database 312. The database 312 can be stored on a data storage device associated with the response generation component 128. In other examples, the database 312 can be provided on a cloud storage or other remote data store accessed via a network. The database 312 stores the generated utterances, predefined answers, variation utterances, the original policy document(s) and/or any other relevant documents for response generation.

The system generates the weighted summarization response 142 based on the one or more predefined answers 132 to the selected utterances. The response is displayed on the chatbot interface 304. The chatbot interface can be implemented in any type of user interface associated with the user, such as, but not limited to, the user interface component 110 or the user interface component 122 in FIG. 1.

Figure 4:
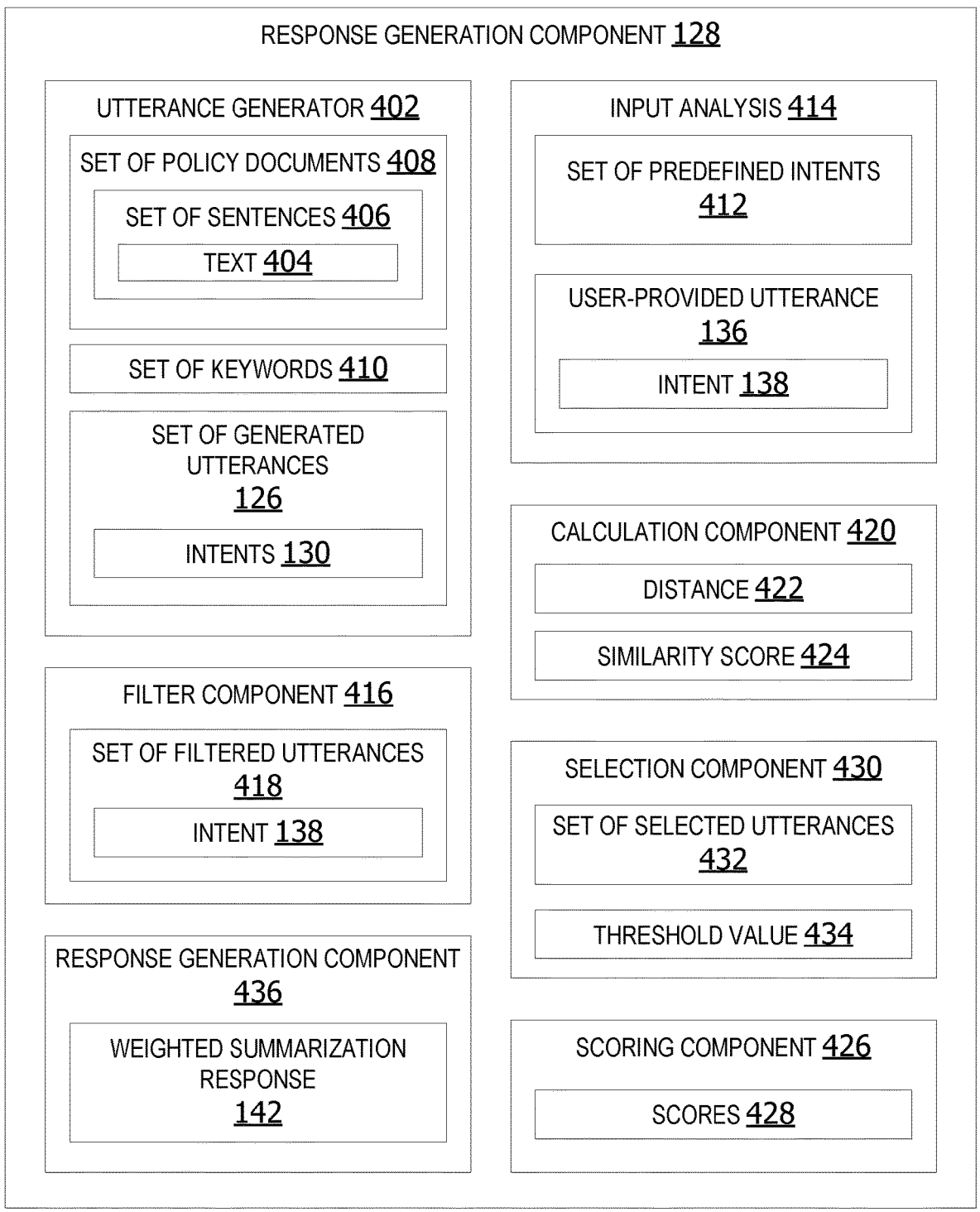
FIG. 4 is an exemplary block diagram illustrating a response generation component for generating weighted summarization responses to user-generated utterances.

FIG. 4 is an exemplary block diagram illustrating a response generation component for generating weighted summarization responses to user-generated utterances. In some examples, an utterance generator 402 analyzes text 404 associated with a set of one or more sentences 406 in a set of policy documents 408 to create the set of generated utterances 126. The set of sentences 406 can include one or more individual sentences and/or one or sentences forming one or more paragraphs. The set of policy documents include one or more documents associated with one or more entities (subjects). A policy document in some examples is a document in a PDF format or a word document.

The utterance generator 402 analyzes the text to create one or more utterances and one or more answers (predefined answers) for each utterance. In some non-limiting examples, the utterance generator assigns one or more intents 130 to each utterance in the set of generated utterances 126 based on a set of one or more keywords 410 in each utterance. In other words, the utterance generator assigns an intent from the set of pre-defined intents 412 to each utterance in the set of generated utterances based on the set of keywords in each utterance. The set of pre-defined intents 412 is an exhaustive list of possible intents associated with the set of policy documents 408.

In some examples, the utterance generator 402 performs the task of utterance generation as a sequence-to-sequence learning problem that directly maps a sentence from a text paragraph to an utterance. The utterance generator finds the best utterance that maximizes the conditional likelihood of the predicted question sequence given the sentence extracted from the policy document.

In other examples, the utterance generator breaks a document down into sub-documents by the process of moving cumulative sentences of sizes up to 5. Keywords are obtained from these sub-documents via intent identification, in which each sub document is treated as an utterance. Keyword extraction is performed on each sub-document to obtain one or more keywords. Also, sub-documents are trained with different word-embedding techniques.

An input analysis component 414 in other examples analyzes a user-provided utterance 136 and identifies an intent 138 from the set of pre-defined intents 412 associated with an entity of the user-provided utterance 136. The identified intent 138 can include one or more intents associated with the user-provided utterance. In other words, if the response generation component 128 cannot isolate a single intent of the user's query, the identified intent 138 can include two or more possible intents of the user-provided utterance.

In some examples, the input analysis component includes a rasa_nlu model. The rasa_nlu model is trained using the set of generated utterances for which intents and entities are known with the pre-defined set of intents. The model provides (outputs) the most probable intent and the respective entities for each utterance.

A filter component 416 identifies a set of one or more filtered utterances 418 from the set of generated utterances 126. Each filtered utterance in the set of filtered utterances 418 has the same intent 138 as the user-provided utterance 136. In some non-limiting examples, if an utterance having the same intent cannot be identified, the system identifies/filters for one or more utterances having a similar intent as the user-provided utterance 136.

A calculation component 420 computes a distance 422 between the user-provided utterance 136 and each utterance in the set of filtered utterances 418. A scoring component 426 generates scores 428 for the set of filtered utterances 418. In some examples, the scoring component 426 generates a similarity score 424 for each utterance in the set of filtered utterances 418 based on the computed distance 422 between each utterance and the user-provided utterance.

In some examples, the calculation component generates a numerical representation for one or more words in an utterance to compute the distance. While computing distance for a sentence, the sentence is converted to a particular number. The numerical representation of all the words in the sentence are used to take an average. The average value is used to calculate the numerical representation for the entire sentence. The distance between two sentences is calculated using these average values.

A selection component 430 selects a set of utterances 432 from the set of filtered utterances 418 having a similarity score 424 exceeding a user-defined threshold value 434. In other words, the selection component 430 selects the filtered utterances that are closest or most similar to the user-provided utterance.

A response generation component 436 retrieves the pre-defined answer to each of the selected utterances. The response generation component 436 generates a weighted summarization response 142 based on a predefined answer to each utterance in the selected set of utterances 432. In some examples, the weighted summarization response is output via a user interface device.

If the set of selected utterances 432 only includes a single utterance, the weighted summarization response 142 includes only a single predefined answer to the selected utterance. In other words, once the utterance intent is identified, the system can determine that the user-provided utterance (query) is exactly same as the trained or generated utterance. In that case, the output response is the same as the response mapped to the generated utterance (same response which led to the generated utterance).

If the set of selected utterances 432 includes two or more utterances, the system combines and/or modifies the two or more predefined answers mapped to the selected utterances to generate a customized weighted summarization response 142 to the user-provided utterance 136.

In another example, if the input user-provided utterance is different from a generated utterance in the set of generated utterances, the response generation component identifies the intent of the user-provided utterance, filters the generated utterances to identify utterances with same intent and computes an index of similarity of the user-provided utterance with the filtered utterances. The response generation component creates a response as a weighted summarization of the responses of the filtered utterances.

In other non-limiting examples, similarity scores for each document or sub-document associated with an utterance is also computed. A response is created based on the aggregation of all the above outputs, coupled with intelligent summarization to make the response short and crisp.

In a non-limiting, illustrative example, if a user-provided utterance asks, "What should be a person's age for buying and selling alcohol in Arkansas?" the response generation component analyzes the user-provided utterance using machine learning, such as, but not limited to, analysis by a pre-trained rasa NLU machine learning model. The system analyzes the user-provided utterance to identify the intent of the user-provided utterance. The system identifies utterances with intents having a shortest distance from the intent of the user-provided utterance are filtered.

In this example, utterances are filtered where p>0.3, such that the intent associated with age has a higher probability (age=p>0.65) than the intent associated with pricing if (pricing=p>0.32). If the system identifies a first generated utterance "What is the minimum age of buying alcohol in Arkansas" and a second generated utterance "What is the minimum age for selling alcohol in Arkansas" as having the same or similar intent (highest probability>0.6), the system calculates a distance between the user-provided utterances and the generated utterances filtered.

If the distance between the user-provided utterance and the first generated utterance is 0.35 and the calculated distance between the user-provided utterance and the second generated utterance is also 0.35, both filtered utterances have the same distance and are given the same the similarity scores. In this non-limiting example, the mapped response to the first generated response "A person should be eighteen years old to buy alcohol in the state of Arkansas" and the response to the second generated response "A person should be twenty-one years old to sell alcohol in the state of Arkansas" are given equal weight (0.5) due to their equal scores. Therefore, the system generates a weighted summarized response containing a combination of both responses. The final output response in this example is "A person should be eighteen years old to purchase alcohol and twenty-one years old to sell alcohol in the state of Arkansas." The output response is different than both the pre-generated responses mapped to the generated utterances in the system database. Thus, a customized response is generated and output to the user.

In the example above, if the two selected utterances have different weight, the response mapped to the highest weight utterance is output to the user. For example, if the first generated utterance has a weight of 0.5 and the second utterance has a weight of 0.3, only the response to the first generated utterance is output because it has the highest score and the highest corresponding weight.

Figure 5:
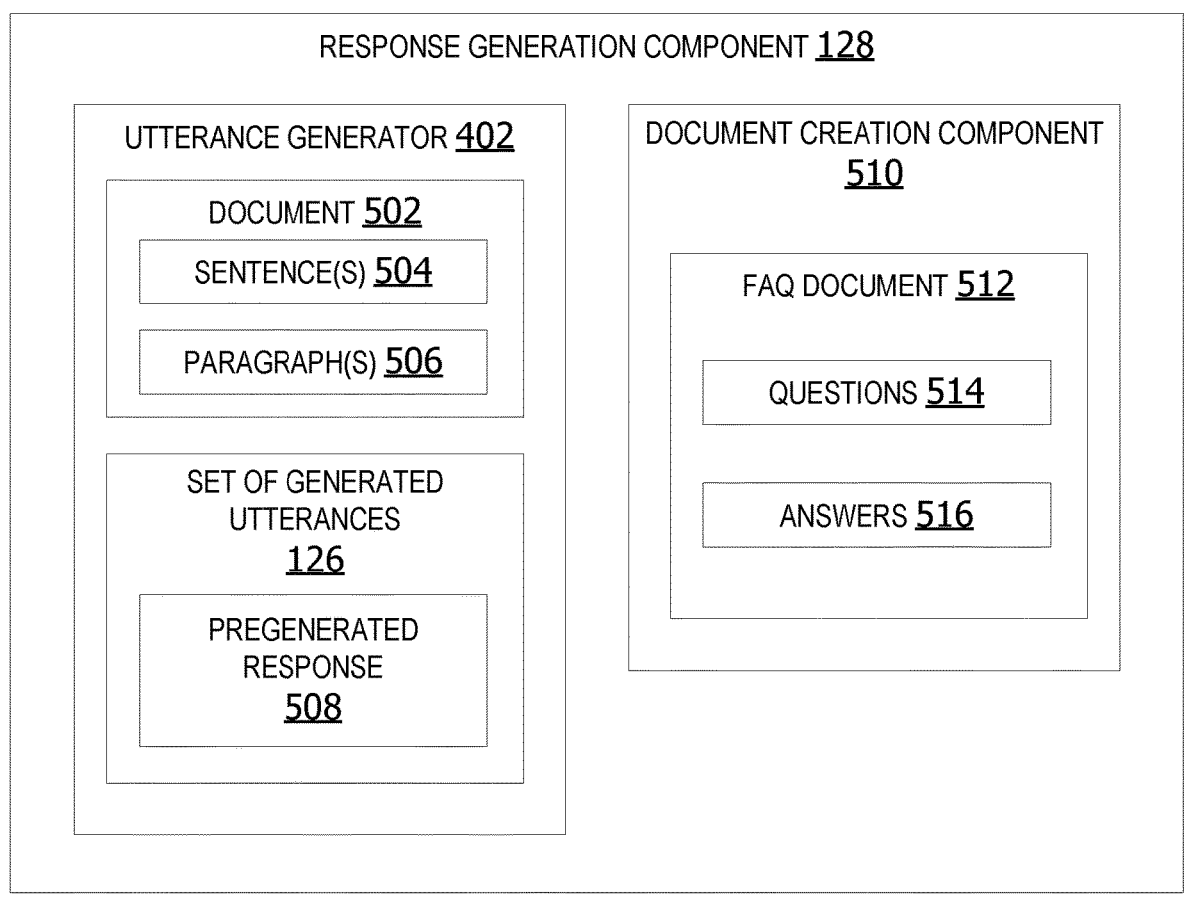
FIG. 5 is an exemplary block diagram illustrating a response generation component for generating frequently asked questions (FAQ) documents based on a set of generated utterances and pre-generated responses.

FIG. 5 is an exemplary block diagram illustrating a response generation component 128 for generating frequently asked questions (FAQ) documents based on a set of generated utterances 126 and pre-generated responses. The utterance generator 402 in some examples analyzes or parses one or more sentence(s) 504 and/or one or more paragraph(s) 506 within a document 502 to autonomously create a set of generated utterances 126 and a pre-generated response to each utterance in the set of generated utterances 126. The document 502 is a document including information associated with one or more subjects. The document can be implemented as an employee manual, an instruction manual, a policy document, a legal document, or any other type of document including factual information, laws, policies, guidelines or other data. In some examples, the document 502 is a document from the set of policy documents 408 in FIG. 4.

A document creation component 510 generates a frequently asked questions (FAQ) document 510 based on the set of generated utterances 126 and the pre-generated response 508 to each utterance in the set of generated utterances. The FAQ document includes questions 514 which are likely to be asked by a user and the answers 516 to those questions based on information provided within the document 502.

Figure 6:
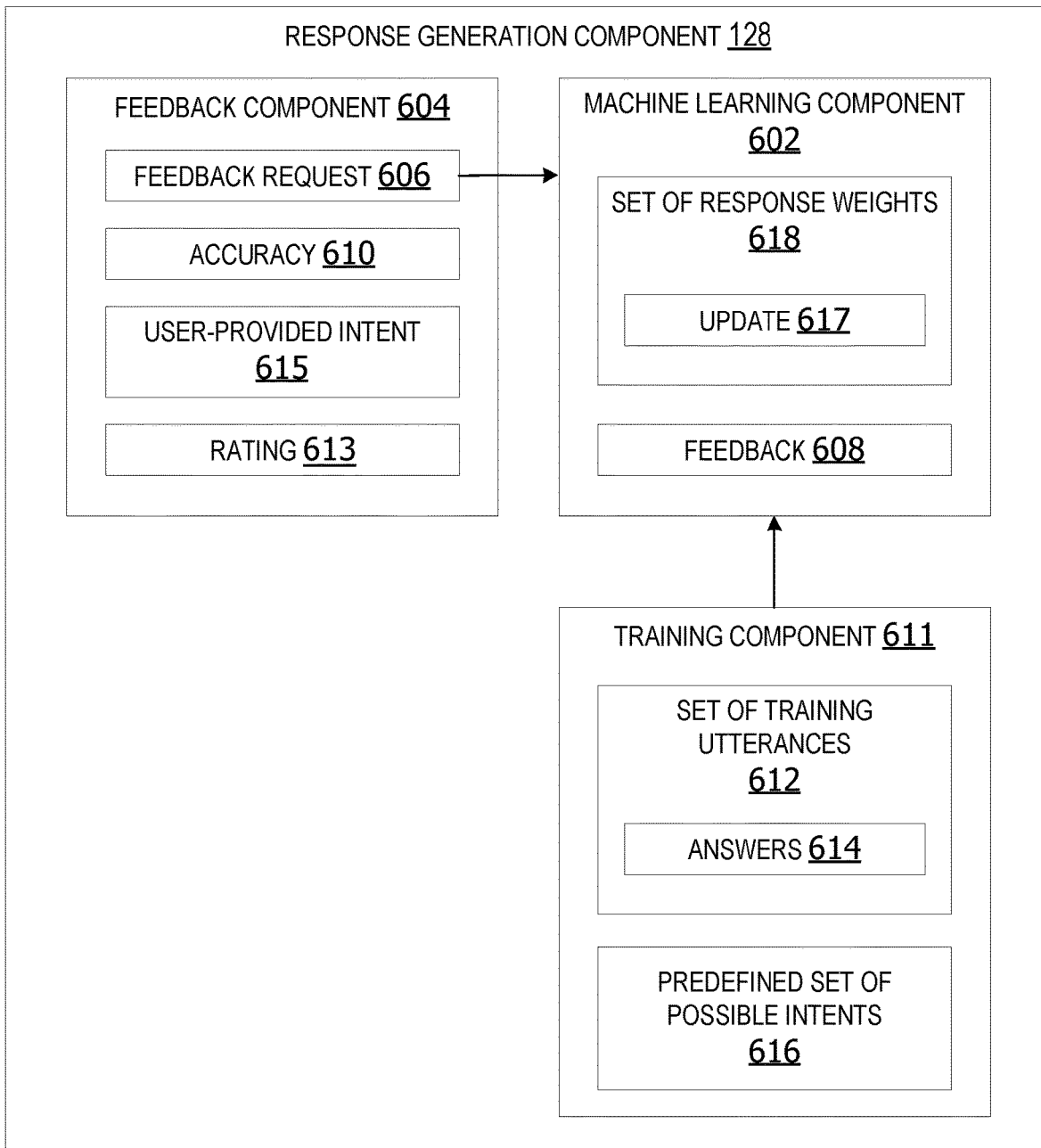
FIG. 6 is an exemplary block diagram illustrating a machine learning component associated with a response generation component.

FIG. 6 is an exemplary block diagram illustrating a machine learning component 602 associated with a response generation component 128. In some examples, a feedback component 604 outputs a feedback request 606 to a user after a response is sent to the user. In some examples, the system requests feedback if it is not confident about the selected utterance associated with the highest probability intent identified by the response generation system.

The user can provide feedback 608 associated with the accuracy 610 of the response. The accuracy 610 feedback indicates how closely or accurately the response answered the user's question. The feedback 608 can also include a user-provided intent 615 if the identified intent assigned to the user's query is incorrect. The user can select a user-provided intent from an exhaustive list of possible intents provided by the feedback component.

In other examples, the feedback 608 can include a rating 613. The rating is any type of rating or score indicating quality of the generated response on a scale or in a percentage regarding accuracy of the weighted summarization response relative to the user-provided utterance.

The machine learning component 602 analyzes the feedback 608 received from at least one user with regard to accuracy of the weighted summarization response with regard to the user-provided utterance. The machine learning component 602 includes artificial intelligence algorithms for analyzing the feedback. The machine learning component performs an update 617 of the set of response weights 618 used to generate customized responses to user queries (user-provided utterances) based on the feedback received from one or more user(s). The set of response weights are weights used to determine which pre-generated answer to an utterance is a set of multiple selected utterances should be given most weight where multiple possible utterance-response combinations appear to be responsive to the user-provided utterance.

In other words, multiple similar utterances are selected by the system. The system computes the similarity index of the user-provided utterance with each of the utterances selected which have the same or similar intent as the user-provided utterance. The system calculates the weight of the response for each of the selected utterances to identify a best response or combine the responses into a customized response. In other words, the weighted summarized response can include multiple predefined answers to multiple generated utterances combined into a single response based on the weights applied to each response and/or the similarity scores.

The response is not one to one mapping. The system can combine multiple responses. Based on the similarity scores, the system generates a weighted summarized response from a set of responses for the selected utterances determined to be closest to the user's query.

A training component 611, in some examples, inputs a set of training utterances 612, corresponding answers 614 to each utterance in the set of training utterances 612 and a predefined set of one or more possible intents 616 associated with the set of training utterances into the machine learning component 602. The set of training utterances are user-created training data. In some examples, the set of training utterances 612 includes hundreds or thousands of training utterances.

The set of training utterances in some examples include training questions (utterances) unrelated to the set of policy documents used by the response generation component to create the set of generated utterances. For example, the system can be trained using utterances associated with an employee policy manual even if the system is going to be used to generate utterances and responses associated with business law (legal) documents or product handling regulation documents. Thus, once the system is trained, the system can be used to analyzes any types of documents to generate utterances and answer queries associated with any topics/subjects unrelated to the training data.

In some examples, the system utilizes an utterance generating algorithm applying a sequence-to-sequence algorithm. The machine learning component is trained by inputting the predefined set of questions and answers as training data to train the sequence-to-sequence model. The training data includes any type of question and answer pairs. In a non-limiting example, the training data can include ten or twenty thousand question and answer pairs to train the model.

When a sentence is passed to the machine learning, the model learns to convert the sentence to a question mapped to an answer. The training data can include any previous question and answer data pairs. The training questions and answers teach the machine learning model how to generate a question when supplied with an answer/statement. It is not necessary to train the system using the same policy document.

Figure 7:
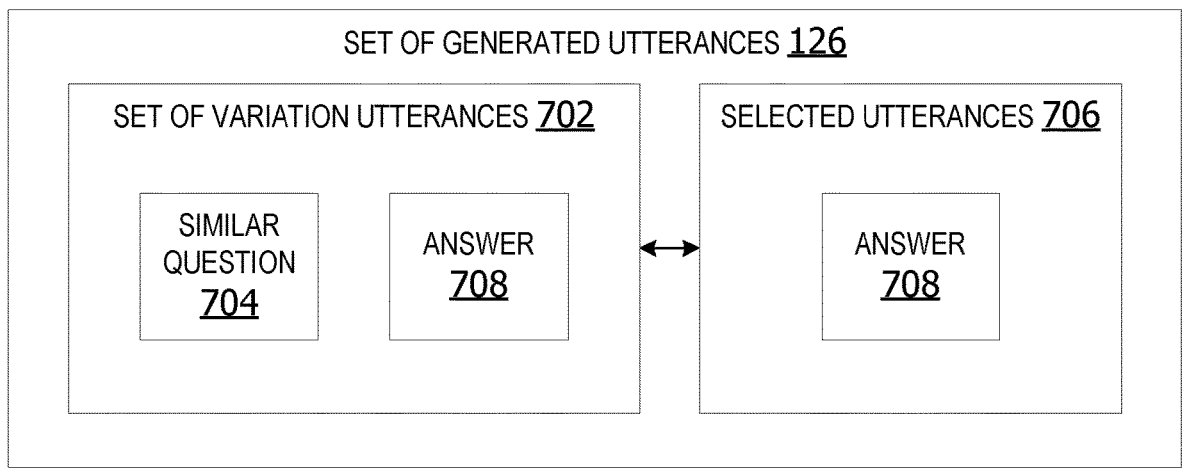
FIG. 7 is an exemplary block diagram illustrating a set of generated utterances.

FIG. 7 is an exemplary block diagram illustrating a set of generated utterances 126. In some examples, the set of generated utterances 126 includes a set of variation utterances 702 associated with a selected utterance 706 from the set of generated utterances. The set of variation utterances 702 includes at least one similar question 704 that is a variation of the selected utterance 706. The set of variation utterances 702 is mapped to the same answer 708 as the answer 708 to the selected utterance 706.

Figure 8:
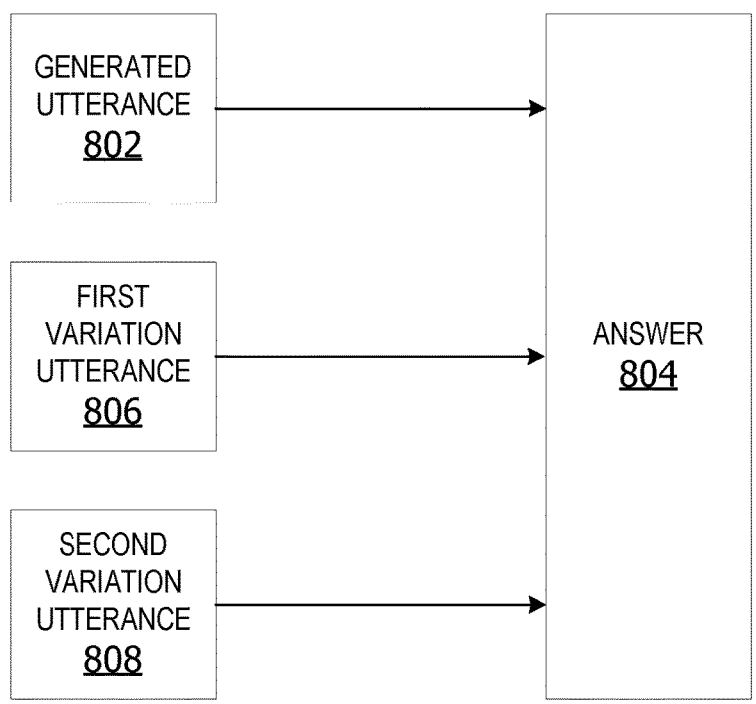
FIG. 8 is an exemplary block diagram illustrating a set of variation utterances mapped to a same answer.

FIG. 8 is an exemplary block diagram illustrating a set of variation utterances mapped to a same answer. In this example, a generated utterance 802 is mapped to an answer 804. The generated utterance 802 can be, without limitation, an utterance "what day is recycling collected?" The answer 804 can be, without limitation, the answer "Recycling is collected every Friday except on federal holidays."

A first variation utterance 806 is mapped to the same answer 804. The first variation utterance 806 is a slightly different utterance providing a variation on the wording or form of the generated utterance 802. For example, the first variation utterance 806 can be, without limitation, "When is recycle pickup?"

A second variation utterance 808 is also mapped to the same answer 804 in this non-limiting example. The second variation is another variation of the original generated utterance 802. The second variation utterance 808 can be, without limitation, the utterance "How often is recycling picked up?" The possible variations of the generated utterance 802 are not limited to the examples shown here. The examples could include other variations of the question. Each of the possible variations of the generated utterance 802 are generated and mapped to the same answer 804 in these examples.

Figure 9:
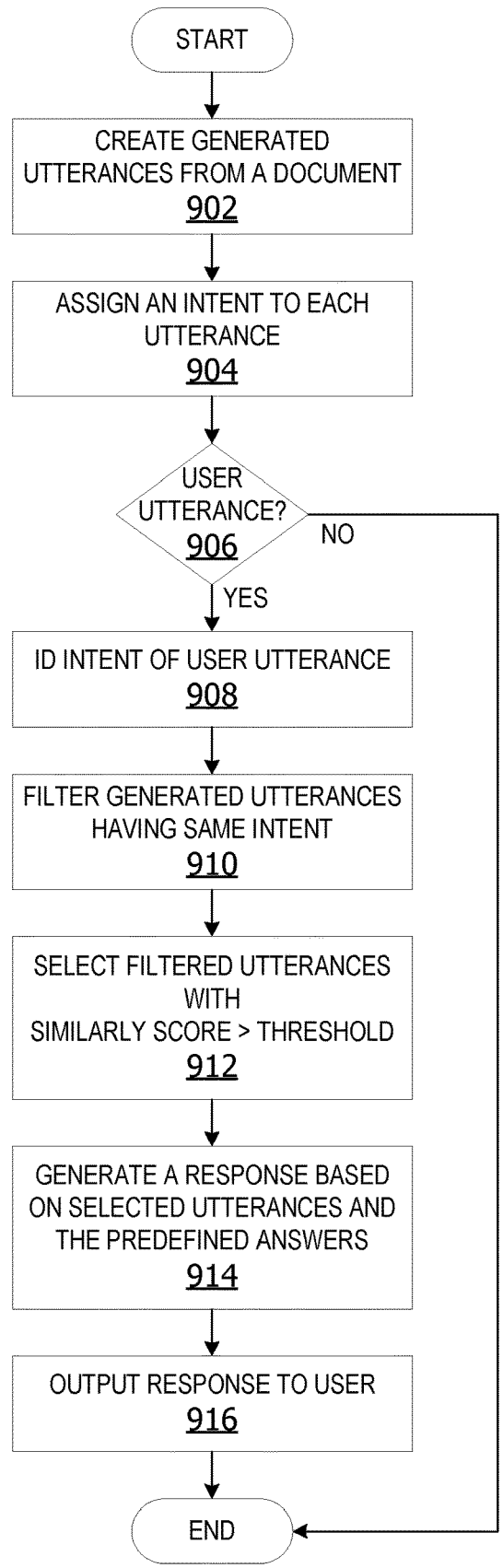
FIG. 9 is an exemplary flow chart illustrating operation of the computing device to dynamically generate a customized response to a user-provided utterance.

FIG. 9 is an exemplary flow chart illustrating operation of the computing device to dynamically generate a customized response to a user-provided utterance. The process shown in FIG. 9 is performed by a response generation component, executing on a computing device, such as the computing device 102 or the user device 116 in FIG. 1.

The process begins by creating generated utterances from a document at 902. The document can by any type of document having information, such as, but not limited to, the set of policy documents 408 in FIG. 4 and/or the document 502 in FIG. 5. The response generation component assigns an intent to each utterance in the set of generated utterances at 904. The response generation component determines whether a user provides an utterance at 906. If yes, the response generation component identifies an intent of the user utterance at 908. The user utterance is a query, such as, but not limited to, the user-provided utterance 136 in FIG. 1, the query 202 in FIG. 2 and/or the query 302 in FIG. 3.

The response generation component filters generated utterances having the same intent as the user-provided utterance at 910. The response generation component selects one or more filtered utterances with a similarity score that is greater than a threshold at 912. The response generation component generates a response to the user-generated utterance based on selected utterances and predefined answers to the selected utterances at 914. The response generation component outputs the response to the user at 916. The process terminates thereafter.

While the operations illustrated in FIG. 9 are performed by a computing device, aspects of the disclosure contemplate performance of the operations by other entities. In a non-limiting example, a cloud service performs one or more of the operations.

Figure 10:
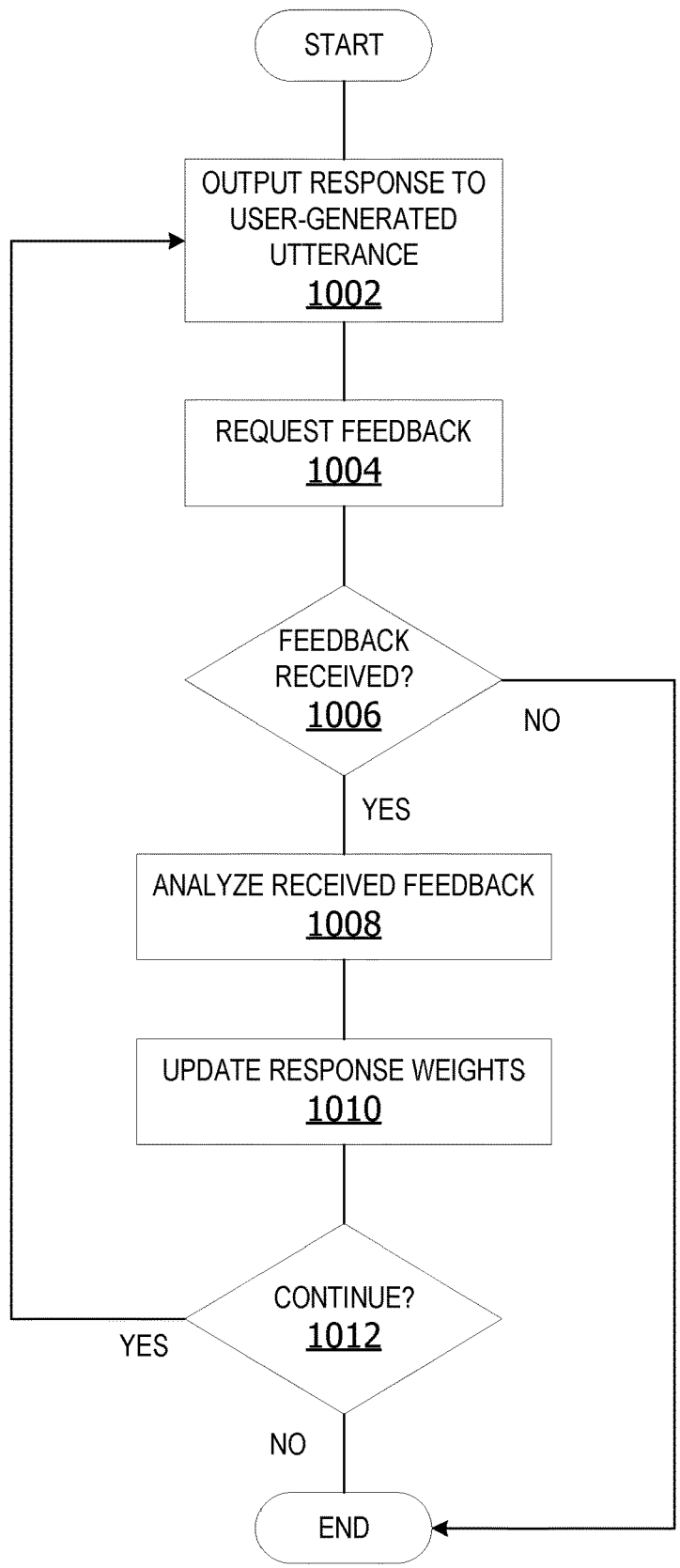
FIG. 10 is an exemplary flow chart illustrating operation of the computing device to update response generation process based on user-provided feedback.

FIG. 10 is an exemplary flow chart illustrating operation of the computing device to update response generation process based on user-provided feedback. The process shown in FIG. 10 is performed by a response generation component, executing on a computing device, such as the computing device 102 or the user device 116 in FIG. 1.

The process begins by outputting a response to a user-generated utterance at 1002. The response generation component requests feedback from the user at 1004. The response generation component determines whether feedback is received at 1006. If yes, the response generation component analyzes received feedback at 1008. The response generation component updates a set of response weights at 1010 based on the analysis results. The response generation component determines whether to continue at 1002. If yes, the process iteratively executes operations 1002 through 1012 until a decision is made not to continue at 1012. The process terminates thereafter.

While the operations illustrated in FIG. 10 are performed by a computing device, aspects of the disclosure contemplate performance of the operations by other entities. In a non-limiting example, a cloud service performs one or more of the operations.

Figure 11:
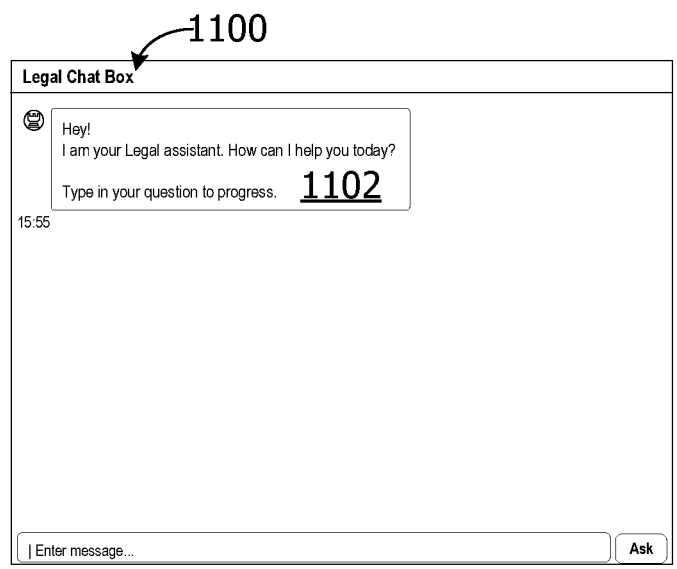
FIG. 11 is an exemplary screenshot illustrating a chatbot interface.

FIG. 11 is an exemplary screenshot 1100 illustrating a chatbot interface. The interface shown in the screenshot 1100 is presented to the user via a user interface device associated with a computing device, such as, but not limited to, the user interface component 110 or the user interface component 122 in FIG. 1. A user enters a query or other user-provided utterance via a text box 1102 or other input means. In this example, the query/utterance is entered via a touchscreen, keyboard, microphone (speech recognition) or any other type of input device associated with inputting a query or other user-interface.

Figure 12:
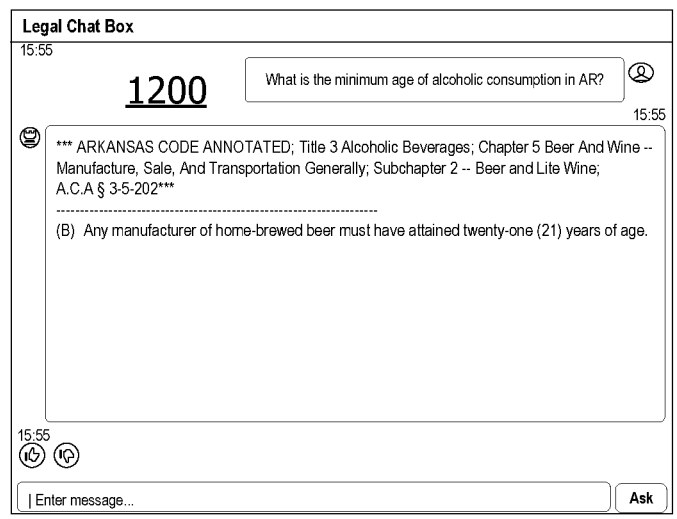
FIG. 12 is an exemplary screenshot illustrating an example utterance and response.

FIG. 12 is an exemplary screenshot 1200 illustrating an example utterance and response. In this non-limiting example, the user-provided utterance asks the question "What is the minimum age of alcohol consumption in Arkansas." A response, including a relevant response based on Arkansas law is output to the user.

Figure 13:
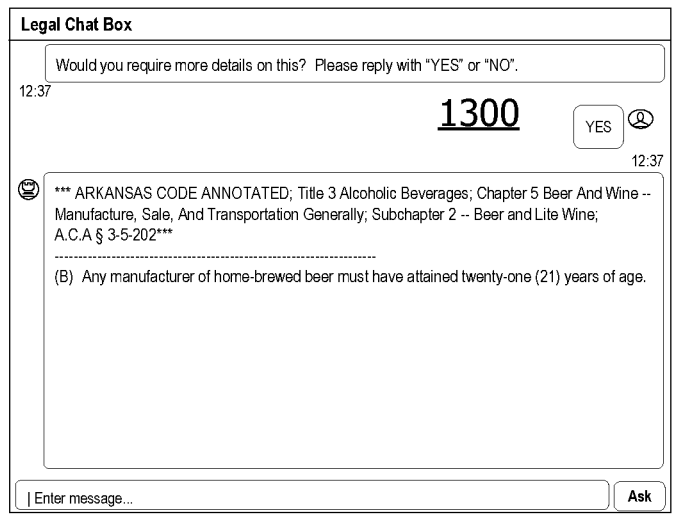
FIG. 13 is an exemplary screenshot illustrating a detailed response generated based on a user-provided utterance.

FIG. 13 is an exemplary screenshot 1300 illustrating a detailed response generated based on a user-provided utterance. In this example, the system permits the user to request additional/more detailed information.

Figure 14:
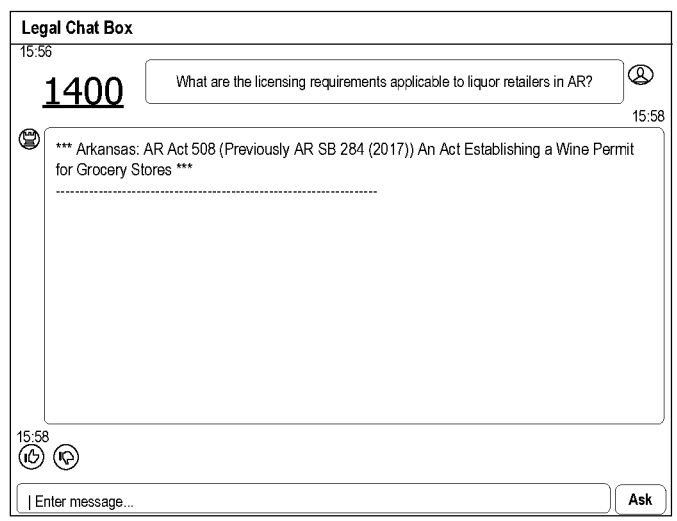
FIG. 14 is an exemplary screenshot illustrating an exemplary utterance and a response to the utterance.

FIG. 14 is an exemplary screenshot 1400 illustrating an exemplary utterance and a response to the utterance. In this non-limiting example, the user inputs a query associated with obtaining licensing information for grocery stores. The system provides a response including the relevant portion of information responsive to the query.

ADDITIONAL EXAMPLES

In some examples, the system provides an end-to-end method for generating utterances and customized responses to user queries based on information documents, such as a policy document. In this manner, the system reduces or eliminates time spent by users manually creating utterances and mapping those utterances to answers. The system further improves user interface with a chatbot system where the response generation dynamically generates customized weighted response summarization to user utterances based on pre-generated utterances and variations of the pre-generated utterances. Generating variations of the training utterances further enables improved training of chatbot systems.

In an example scenario, a user submits a user-provided utterance (query) to the system. A pre-trained machine learning model using an exhaustive list of intents and entities to identify the top "k" number of entities having the same intent at a probability greater than point three percent (k>0.3). The system filters the utterances to select those closest to the user-provided utterance having the higher probability (k>0.6). The system computes the similarity index of the user-provided utterance (query) with the filtered utterances. The system generates a weighted summarization of the responses of the utterances with the weight being proportional to the similarity score. The response is sent back to the user.

In another example, the system verifies the intent assigned to the user-provided utterance is correct by requesting feedback from the user. If the feedback indicates the intent was incorrect, the system can request the user identify the actual intent of the user-provided utterance in the feedback data. The system uses the feedback to retrain the machine learning model for improved response generation to future user-provided utterances.

Alternatively, or in addition to the other examples described herein, examples include any combination of the following:

- an utterance generator, implemented on the at least one processor, analyzes a text associated with a set of sentences in a set of policy documents to create the set of generated utterances;
- an input analysis component, implemented on the at least one processor, analyzes a user-provided utterance and identifies an intent from a set of pre-defined intents associated with an entity of the user-provided utterance;
- a document creation component, implemented on the at least one processor, generates a frequently asked questions (FAQ) document based on the set of generated utterances and a pre-generated response to each utterance in the set of generated utterances;

a feedback component, implemented on the at least one processor, requests feedback from the user regarding accuracy of the weighted summarization response relative to the user-provided utterance;

a machine learning component, implemented on the at least one processor, analyzes feedback received from at least one user with regard to accuracy of the weighted summarization response with regard to the user-provided utterance and updates a set of response weights based on the feedback;

an assignment component, implemented on the at least one processor, assigns an intent from the set of pre-defined intents to each utterance in the set of generated utterances based on a set of keywords in each utterance;

a training component, implemented on the at least one processor, inputs a set of training utterances and corresponding answers and a predefined set of possible intents into an utterance generation component to train the component in generating utterances based on text in at least one policy document;

creating, by an utterance generator, a set of generated utterances based on text associated with a set of sentences in at least one document, each utterance in the set of generated utterances assigned an intent;

filtering, by a filter component, at least one utterance from the set of generated utterances having a same intent as a user-provided utterance to form a set of filtered utterances, the user-provided utterance received from a user device associated with the user via a network;

selecting, by a selection component, a set of utterances from the set of filtered utterances having a similarity score exceeding a threshold value, the similarity score indicates a degree of similarity between the generated utterance and the user-provided utterance;

generating, by a response generation component, a weighted summarization response based on a pre-defined answer to each utterance in the selected set of utterances;

outputting, via the user interface device, the weighted summarization response to the user associated with the user-provided utterance;

generating, by a calculation component, a distance between the user-provided utterance and each utterance in the set of filtered utterances;

analyzing, by a machine learning component, feedback received from at least one user with regard to accuracy of the weighted summarization response with regard to the user-provided utterance and updates a set of response weights based on the feedback;

training a machine learning component via a set of training utterances, a response corresponding to each utterance in the set of training utterance and a pre-defined set of possible intents;

assigning, by an assignment component, an intent from the set of pre-defined intents to each utterance in the set of generated utterances based on a set of keywords in each utterance;

generating, by a document creation component, a FAQ document based on the set of generated utterances and a pre-generated response to each utterance in the set of generated utterances;

assigning, by a scoring component, a similarity score for each utterance in the set of filtered utterances based on the computed distance for each utterance;

generating a set of variation utterances associated with a selected utterance from the set of generated utterances, wherein the set of variation utterances comprises at least one similar question that is a variation of the selected utterance;

adding the set of variation utterances to the set of generated utterances, wherein each utterance is the set of variation utterances is mapped to a same answer for the selected utterance;

filtering, by a filter component, at least one utterance from the set of generated utterances having a same intent as a user-provided utterance to form a set of filtered utterances, the user-provided utterance received from a user device associated with the user via a network;

selecting, by a selection component, a set of utterances from the set of filtered utterances having a similarity score exceeding a threshold value, the similarity score indicates a degree of similarity between the generated utterance and the user-provided utterance;

generating, by a response generation component, a weighted summarization response based on a pre-defined answer to each utterance in the selected set of utterances and a set of weights;

outputting, via the user interface device, the weighted summarization response to the user associated with the user-provided utterance;

updating the set of weights based on feedback received from at least one user rating the weighted summarization response relative to the user-provided utterance;

creating a set of generated utterances based on text associated with a set of sentences in at least one document, each utterance in the set of generated utterances assigned an intent;

generating a FAQ document based on the set of generated utterances and a pre-generated response to each utterance in the set of generated utterances;

a calculation component, implemented on the at least one processor, computes a distance between the user-provided utterance and each utterance in the set of filtered utterances; and a scoring component, implemented on the at least one processor, generates a similarity score for each utterance in the set of filtered utterances based on the computed distance for each utterance.

At least a portion of the functionality of the various elements in FIG. 1, FIG. 2, FIG. 3, FIG. 4, FIG. 5, FIG. 6, FIG. 7 and FIG. 8 can be performed by other elements in FIG. 1, FIG. 2, FIG. 3, FIG. 4, FIG. 5, FIG. 6, FIG. 7 and FIG. 8, or an entity (e.g., processor 106, web service, server, application program, computing device, etc.) not shown in FIG. 1, FIG. 2, FIG. 3, FIG. 4, FIG. 5, FIG. 6, FIG. 7 and FIG. 8.

In some examples, the operations illustrated in FIG. 9 and FIG. 10 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating responses to a user query. For example, the elements illustrated in FIG. 1, FIG. 2, FIG. 3, FIG. 4, FIG. 5, FIG. 6, FIG. 7 and FIG. 8, such as when encoded to perform the operations illustrated in FIG. 9 and FIG. 10, constitute exemplary means for creating a set of generated utterances based on text associated with a set of sentences in at least one document, each utterance in the set of generated utterances assigned an intent; exemplary means for filtering at least one utterance from the set of generated utterances having a same intent as a user-provided utterance to form a set of filtered utterances; exemplary means for selecting a set of utterances from the set of filtered utterances having a similarity score exceeding a threshold value, the similarity score indicates a degree of similarity between the generated utterance and the user-provided utterance; exemplary means for generating a weighted summarization response based on a predefined answer to each utterance in the selected set of utterances; and exemplary means for outputting, via the user interface device, the weighted summarization response to the user associated with the user-provided utterance.

Other non-limiting examples provide one or more computer storage devices having a first computer-executable instructions stored thereon for providing automated response generation to a user query. When executed by a computer, the computer performs operations including filtering at least one utterance from the set of generated utterances having a same intent as a user-provided utterance to form a set of filtered utterances; selecting a set of utterances from the set of filtered utterances having a similarity score exceeding a threshold value; generating a weighted summarization response based on a predefined answer to each utterance in the selected set of utterances and a set of weights; outputting the weighted summarization response to the user associated with the user-provided utterance; and updating the set of weights based on feedback received from at least one user rating the weighted summarization response relative to the user-provided utterance.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for customized document-based response generation to a user query, the system comprising:
   a memory;
   at least one processor communicatively coupled to the memory;
   a filter component, implemented on the at least one processor, identifies a set of filtered utterances from a set of generated utterances having a same intent as an identified intent associated with a user-provided utterance;
   a calculation component, implemented on the at least one processor, computes a distance between the user-provided utterance and each utterance in the set of filtered utterances;
   a scoring component, implemented on the at least one processor, generates a similarity score for each utterance in the set of filtered utterances based on the distance for each utterance;
   a selection component, implemented on the at least one processor, selects a set of utterances from the set of filtered utterances having the similarity score exceeding a threshold value;
   a response generation component, implemented on the at least one processor, generates a weighted summarization response based on a predefined answer to each utterance in a selected set of utterances; and
   a user interface device outputs the weighted summarization response to a user associated with the user-provided utterance.

2. The system of claim 1, further comprising:
   an utterance generator, implemented on the at least one processor, analyzes a text associated with a set of sentences in a set of policy documents to create the set of generated utterances.

3. The system of claim 1, further comprising:
   an input analysis component, implemented on the at least one processor, analyzes the user-provided utterance and identifies an intent from a set of pre-defined intents associated with an entity of the user-provided utterance.

4. The system of claim 1, further comprising:
   a document creation component, implemented on the at least one processor, generates a frequently asked questions (FAQ) document based on the set of generated utterances and a pre-generated response to each utterance in the set of generated utterances.

5. The system of claim 1, further comprising:
   a feedback component, implemented on the at least one processor, requests feedback from the user regarding accuracy of the weighted summarization response relative to the user-provided utterance.

6. The system of claim 1, further comprising:
   a machine learning component, implemented on the at least one processor, analyzes feedback received from at least one user with regard to accuracy of the weighted summarization response with regard to the user-provided utterance and updates a set of response weights based on the feedback.

7. The system of claim 1, further comprising:
   an assignment component, implemented on the at least one processor, assigns an intent from a set of pre-defined intents to each utterance in the set of generated utterances based on a set of keywords in each utterance.

8. The system of claim 1, further comprising:
   a training component, implemented on the at least one processor, inputs a set of training utterances and corresponding answers and a predefined set of possible intents into an utterance generation component to train the component in generating utterances based on text in at least one policy document.

9. A computer-implemented method for generating responses to user provided queries, the computer-implemented method comprising:
   creating, by an utterance generator, a set of generated utterances based on text associated with a set of sentences in at least one document, each utterance in the set of generated utterances assigned an intent;
   filtering, by a filter component, at least one utterance from the set of generated utterances having a same intent as a user-provided utterance to form a set of filtered utterances, the user-provided utterance received from a user device associated with the user via a network;
   selecting, by a selection component, a set of utterances from the set of filtered utterances having a similarity score exceeding a threshold value, the similarity score indicates a degree of similarity between the generated utterance and the user-provided utterance;
   generating, by a response generation component, a weighted summarization response based on a predefined answer to each utterance in a selected set of utterances; and
   outputting, via the user device, the weighted summarization response to the user associated with the user-provided utterance.

10. The computer-implemented method of claim 9, further comprising:
    generating, by a calculation component, a distance between the user-provided utterance and each utterance in the set of filtered utterances.

11. The computer-implemented method of claim 9, further comprising:
    analyzing, by a machine learning component, feedback received from at least one user with regard to accuracy of the weighted summarization response with regard to the user-provided utterance and updates a set of response weights based on the feedback.

12. The computer-implemented method of claim 9, further comprising:
    training a machine learning component via a set of training utterances, a response corresponding to each utterance in the set of training utterance and a predefined set of possible intents.

13. The computer-implemented method of claim 9, further comprising:
    assigning, by an assignment component, a selected intent from a set of pre-defined intents to each utterance in the set of generated utterances based on a set of keywords in each utterance.

14. The computer-implemented method of claim 9, further comprising:
    generating, by a document creation component, a FAQ document based on the set of generated utterances and a pre-generated response to each utterance in the set of generated utterances.

15. The computer-implemented method of claim 9, further comprising:

assigning, by a scoring component, the similarity score for each utterance in the set of filtered utterances based on a distance for each utterance.

16. The computer-implemented method of claim 9, further comprising:
generating a set of variation utterances associated with a selected utterance from the set of generated utterances, wherein the set of variation utterances comprises at least one similar question that is a variation of the selected utterance; and
adding the set of variation utterances to the set of generated utterances, wherein each utterance is the set of variation utterances is mapped to a same answer for the selected utterance.

17. One or more computer storage devices, having computer-executable instructions for a dynamic response generation system for generating customized responses to user queries that, when executed by a computer cause the computer to perform operations comprising:
filtering, by a filter component, at least one utterance from a set of generated utterances having a same intent as a user-provided utterance to form a set of filtered utterances, the user-provided utterance received from a user device associated with the user via a network;
selecting, by a selection component, a set of utterances from the set of filtered utterances having a similarity score exceeding a threshold value, the similarity score indicating a degree of similarity between the generated utterance and the user-provided utterance;
generating, by a response generation component, a weighted summarization response based on a pre-defined answer to each utterance in a selected set of utterances and a set of weights;
outputting, via the user device, the weighted summarization response to the user associated with the user-provided utterance; and
updating the set of weights based on feedback received from at least one user rating the weighted summarization response relative to the user-provided utterance.

18. The one or more computer storage devices of claim 17, wherein the response generation component when further executed by a computer cause the computer to perform operations comprising:
creating the set of generated utterances based on text associated with a set of sentences in at least one document, each utterance in the set of generated utterances assigned an intent.

19. The one or more computer storage devices of claim 17, wherein the response generation component when further executed by a computer cause the computer to perform operations comprising:
generating a FAQ document based on the set of generated utterances and a pre-generated response to each utterance in the set of generated utterances.

20. The one or more computer storage devices of claim 17, wherein the response generation component when further executed by a computer cause the computer to perform operations comprising:
a calculation component, implemented on at least one processor, computes a distance between the user-provided utterance and each utterance in the set of filtered utterances; and
a scoring component, implemented on the at least one processor, generates the similarity score for each utterance in the set of filtered utterances based on the distance for each utterance.

* * * * *